United States Patent
Halavy et al.

(10) Patent No.: US 9,426,423 B2
(45) Date of Patent: Aug. 23, 2016

(54) METHOD AND SYSTEM FOR SYNCHRONIZING AUDIO AND VIDEO STREAMS IN MEDIA RELAY CONFERENCING

(71) Applicant: Polycom, Inc., San Jose, CA (US)

(72) Inventors: Avishay Halavy, Tel Aviv (IL); Amir Yassur, Nordiya (IL)

(73) Assignee: Polycom, Inc., San Jose, CA (US)

( * ) Notice: Subject to any disclaimer, the term of this patent is extended or adjusted under 35 U.S.C. 154(b) by 317 days.

(21) Appl. No.: 14/054,411

(22) Filed: Oct. 15, 2013

(65) Prior Publication Data

US 2014/0118473 A1　　May 1, 2014

Related U.S. Application Data

(60) Provisional application No. 61/721,137, filed on Nov. 1, 2012.

(51) Int. Cl.
*H04N 7/15* (2006.01)
*H04L 29/06* (2006.01)

(52) U.S. Cl.
CPC .............. *H04N 7/152* (2013.01); *H04L 65/403* (2013.01); *H04L 65/605* (2013.01); *H04L 65/607* (2013.01); *H04L 65/80* (2013.01)

(58) Field of Classification Search
CPC combination set(s) only.
See application file for complete search history.

(56) References Cited

U.S. PATENT DOCUMENTS

| | | | |
|---|---|---|---|
| 6,404,745 B1 * | 6/2002 | O'Neil | H04L 12/1827 348/14.09 |
| 6,452,974 B1 * | 9/2002 | Menon | H04N 5/04 348/425.4 |
| 6,674,459 B2 * | 1/2004 | Ben-Shachar | H04N 7/152 348/14.08 |
| 7,084,898 B1 * | 8/2006 | Firestone | H04N 7/152 348/14.08 |
| 7,542,068 B2 | 6/2009 | Eshkoli et al. | |
| 8,228,363 B2 | 7/2012 | Halavy | |
| 2002/0015108 A1 * | 2/2002 | Takashima | H04N 7/152 348/484 |
| 2010/0194847 A1 * | 8/2010 | Halavy | H04N 7/152 348/14.09 |
| 2012/0236111 A1 | 9/2012 | Halavy et al. | |

FOREIGN PATENT DOCUMENTS

JP　　2001-268080　　9/2001

OTHER PUBLICATIONS

Japanese Office Action in co-pending Japanese Application No. P2013-223765 dated Nov. 4, 2014, 6 pages including translation.
Japanese Office Action issued in co-pending Japanese Application No. P2013-223765 dated Jun. 12, 2015, 8 pages.

* cited by examiner

*Primary Examiner* — Joseph J Nguyen
(74) *Attorney, Agent, or Firm* — Blank Rome, LLP

(57) ABSTRACT

A novel technique allows synchronizing a plurality of audio and video streams received at a receiving media relay endpoint via an intermediate node, such as a media relay multipoint control unit. The received streams were generated by a plurality of transmitting media relay endpoints and been relayed to the plurality of receiving media relay endpoints via the intermediate node, but are seen as being using a single time domain, in terms of wall clock and manipulated timestamps, while preserving the correct capture time.

27 Claims, 5 Drawing Sheets

METHOD AND SYSTEM FOR SYNCHRONIZING AUDIO AND VIDEO STREAMS IN MEDIA RELAY CONFERENCING

TECHNICAL FIELD

The present invention relates to audio/video communication and more particularly to the field of multipoint audio/video conferencing.

BACKGROUND ART

As traffic over Internet Protocol (IP) networks continues its rapid growth, with the growth of the variety of multimedia conferencing equipment, more and more people use multimedia conferencing as their communication tool. Today the multimedia conferencing communication can be carried over two types of communication methods, the legacy multimedia conferencing method and the new technique of media relay conferencing method. In this disclosure, the terms: multimedia conference, video conference and audio conference may be used interchangeably and the term video conference can be used as a representative term of them.

The legacy multipoint conference between three or more participants requires a Multipoint Control Unit (MCU). An MCU is a conference controlling entity that is typically located in a node of a network or in a terminal which receives several channels from endpoints. According to some criteria, the MCU processes audio and visual signals and distributes them to a set of connected channels. Examples of MCUs include the MGC-100, RMX 2000, which are available from Polycom, Inc. (RMX-2000 is a registered trademark of Polycom, Inc.) A terminal, which may be referred to as a legacy endpoint (LEP), is an entity on the network, capable of providing real-time, two-way audio and/or audio visual communication with another LEP or with the MCU. A more thorough definition of an LEP and an MCU can be found in the International Telecommunication Union ("ITU") standards, such as but not limited to the H.320, H.324, and H.323 standards, which can be found at the ITU website: www.itu.int.

A common MCU, referred to also as a legacy MCU, may include a plurality of audio and video decoders, encoders, and media combiners (audio mixers and/or video image builders). The MCU may use a large amount of processing power to handle audio and video communication between a variable number of participants (LEPs). The communication can be based on a variety of communication protocols and compression standards and may involve different types of LEPs. The MCU may need to combine a plurality of input audio or video streams into at least one single output stream of audio or video, respectively, that is compatible with the properties of at least one conferee's LEP to which the output stream is being sent. The compressed audio streams received from the endpoints are decoded and can be analyzed to determine which audio streams will be selected for mixing into the single audio stream of the conference. In the present disclosure, the terms decode and decompress can be used interchangeably.

A conference may have one or more video output streams wherein each output stream is associated with a layout. A layout defines the appearance of a conference on a display of one or more conferees that receive the stream. A layout may be divided into one or more segments where each segment may be associated with a video input stream that is sent by a conferee (endpoint). Each output stream may be constructed of several input streams, resulting in a continuous presence (CP) conference. In a CP conference, a user at a remote terminal can observe, simultaneously, several other participants in the conference. Each participant may be displayed in a segment of the layout, where each segment may be the same size or a different size. The choice of the participants displayed and associated with the segments of the layout may vary among different conferees that participate in the same session.

The growing trend of using video conferencing raises the need for low cost MCUs that will enable one to conduct a plurality of conferencing sessions having composed CP video images. This need leads to the new technique of Media Relay Conferencing (MRC).

In MRC, a Media Relay MCU (MRM) receives one or more input streams from each participating Media Relay Endpoint (MRE). The MRM relays to each participating endpoint a set of multiple media output streams received from other endpoints in the conference. Each receiving endpoint uses the multiple streams to generate the video CP image, according to a layout, as well as mixed audio of the conference. The CP video image and the mixed audio are played to the MRE's user. An MRE can be a terminal of a conferee in the session which has the ability to receive relayed media from an MRM and deliver compressed media according to instructions from an MRM. A reader who wishes to learn more about an example of an MRC, MRM, or MRE is invited to read the related U.S. Pat. No. 8,228,363 and U.S. Patent Pub. No. 2012-023611 that are incorporated herein by reference. In the current disclosure, the term endpoint may refer to an MRE or an LEP.

In some MRC systems, a transmitting MRE sends its video image in two or more streams; each stream can be associated with different quality level. The qualities may differ in frame rate, resolution and/or signal to noise ratio (SNR), etc. In a similar way, each transmitting MRE may send its audio in two or more streams that may differ from each other by the compressing bit rate, for example. Such a system can use the plurality of streams to provide different segment sizes in the layouts and different resolutions used by each receiving endpoint, etc. Further, the plurality of streams can be used for overcoming packet loss.

Today, MRC becomes more and more popular. Many video conferencing systems deliver quality levels in parallel within one or more streams. For video for example, the quality can be expressed in number of domains, such as temporal domain (frames per second, for example), spatial domain (HD versus CIF, for example), and/or in quality (sharpness, for example). Video compression standards that can be used for multi-quality streams are H.264 AVC, H.264 annex G (SVC), MPEG-4, etc. More information on compression standards such as H.264 can be found at the ITU website www.itu.int, or at www.mpeg.org.

A reader who wishes to learn more about MRMs and MREs is invited to read U.S. Pat. No. 8,228,363, and U.S. patent application Ser. No. 13/487,703, which are incorporated herein by reference.

In order to achieve good user experience there is a need to synchronize between played video and audio. A common audio and video Real-time Transport Protocol (RTP) comprises an audio video synchronization mechanism. An example of RTP including an audio video synchronization mechanism is described in RFC 3550, the contents of which are incorporated by reference. The mechanism uses timestamps in the RTP header of media packets, and RTCP sender reports (SR) and receiver reports (RR). The SR may include reception report blocks which are equivalent to reception reports that may have been included within an RR. The present disclosure refers to RR also for the cases in which the reception report are included within the SR, and as SR only to the sender report section within the SR. More information on RTP can be found in The Internet Engineering Task Force (IETF) website www.ietf.org.

In order to synchronize between the audio streams and the video streams the transmitting MRE or LEP, inserts timestamps into the header of the audio and video Real-Time Transport Protocol (RTP) packets it sends. The timestamps reflect the capture time of the audio (Audio timestamp, TSa) by the microphone and/or the video (Video timestamp, TSv) by the camera, respectively. The timestamps start for each type of stream (audio or video) at a random value and progress based on a different clock rates for audio and video codecs, 8 KHz for audio and 90 KHz for video, for example.

Periodically, the transmitting endpoint, MRE or LEP, sends for each output stream (Audio or Video) an RTP control (RTCP) sender report (SR). The sender report can include a reference to an associated wall clock at the time the message is sent. The wall clock time (absolute date and time) can be presented using the time format of the network time protocol (NTP), for example. In addition, the RTCP sender report for each stream includes also the associated timestamp, (TSa or TSv, respectively) at the time that the sender report was sent, reflecting the timestamp that would have been placed in an audio/video RTP packet (respectively) if it was transmitted at the time the RTCP message is generated. The time interval between two consecutive RTCP sender reports can be a few seconds, 5 seconds for example.

This mechanism enables the receiving endpoint to correlate between the wall clock of the receiving endpoint and the wall clock of the transmitting endpoint. This correlation can be adjusted each time an RTCP sender report is received. The receiving endpoint can use the wall clock and timestamp in the respective sender reports, to synchronize the received audio and video streams, by adjusting the received audio play time to that of the received video, or vice versa. RTP and RTCP are well known in the art and are described in numerous RFCs. A reader who wishes to learn more about RTP and RTCP is invited to read RFCs 3550, 4585, 4586, and many others that can be found at the Internet Engineering Task Force (IETF) website www.ietf.org, the content of which is incorporated herein by reference.

In a legacy CP transcoding video conferencing, a legacy MCU acts as a receiving entity while obtaining the compressed audio and video streams from the plurality of transmitting legacy endpoints. In addition, a legacy MCU acts as a transmitting entity while transmitting the compressed mixed audio and compressed composed video streams of the conference CP video image toward the plurality of receiving legacy endpoints. In the uplink direction, the RTP timestamps and the RTCP reports provided by the endpoints to the MCU, enable the MCU to synchronize audio and video RTP streams received from multiple sources. In the downlink direction, the MCU generates a video layout and a matching synchronized audio mix. The MCU sends the audio mix and the video layout to the receiving endpoints, each in a single RTP stream, each packet in the stream has its audio timestamps or video timestamps, respectively, accompanied with RTCP reports. In some embodiments of MRC, however, synchronizing between audio and video is more complex because an MRM just relays the media streams while the receiving MRE (RMRE) mixes the audio and composes the CP video images, which are generated by a plurality of transmitting MREs (TMREs), each having its own wall clock and timestamps domains. The mixed audio and the composed CP video image are rendered to a conferee that uses the RMRE.

An example for synchronizing the different streams in MRC is disclosed in the related U.S. Pat. No. 8,228,363 and U.S. patent application Ser. No. 13/487,703. Alternatively, each one of the entities, the MREs as well as the MRM can synchronize their clocks by using Network Time Protocol (NTP) server. Other embodiments of MRM may just relay received RTCP messages from TMREs toward RMREs. The above disclosed methods for synchronizing audio and video in an MRC session consume computing resources at the MRM and/or bandwidth resources between the MRM and the RMREs.

In other embodiments of MRC, due to receiving endpoint processing capabilities, lack of support of audio relay codec or bandwidth limitations, a single audio stream may be sent to a receiving endpoint, which includes a mix of multiple audio streams from the most active speakers, while the video streams of selected MREs are sent separately to the receiving MRE, which composes the streams into a CP video image. In such a situation the received video streams cannot be synchronized to the received audio mix.

SUMMARY OF INVENTION

The above-described deficiencies of synchronization processes between audio and video in an MRC session, do not intend to limit the scope of the inventive concepts of the present disclosure in any manner. The deficiencies are presented for illustration only. The disclosure is directed to a novel technique achieving lip-sync at a RMRE between a video image, originated by a presented MRE, and the associated audio signal, originated by the same presented MRE. In some embodiments of MRC, audio mix can be done by the RMRE. In other embodiments, the audio mix can be done by an MRM by mixing one or more audio streams originated by TMREs. Following the audio mixing in the MRM, a single stream carrying a compressed mixed audio can be sent toward the RMREs. As for the video, the video streams generated by a plurality of TMREs are relayed to the plurality of RMREs via an intermediate node such as the MRM, for example. The disclosed novel technique applies to both types of MRC audio mix embodiments.

An embodiment of the MRM may manipulate the timestamp of each received Audio or Video packet (TSa or TSv) into a manipulated timestamp (MTSa or MTSv). The manipulation can be done by subtracting a delta value ($\Delta$TSa or $\Delta$TSv respectively) from the value of the timestamp embedded in the received RTP packet's header. The $\Delta$TSa and $\Delta$TSv can be calculated for each MRE, after the MRE is connected to the session. In another embodiment the $\Delta$TSa and $\Delta$TSv can be calculated for each media stream received at the MRM. The calculated values of $\Delta$TSa and $\Delta$TSv may remain for the entire session. In some embodiments of the MRM, the $\Delta$TSa and $\Delta$TSv can be re-evaluated from time to time, every few tens of seconds to few tens of minutes, for example. In the current description, an MRM can be used as an intermediate network device that is located between a plurality of MREs.

Calculating the $\Delta$TSa for an audio stream or $\Delta$TSv for a video stream, can be initiated by sending a relevant SR' (audio or video), from the MRM toward an MRE, and waiting to obtain a RR and SR from the MRE. In some embodiments the RR and SR may be combined to one RTCP message. Based on the RR, the relevant round trip time (RTT) between the MRM and the MRE can be calculated. Based on the values of the calculated relevant RTT; the wall clock field in the relevant SR; and the MRM's wall clock when the RR was received from the MRE, the differences between the relevant wall clocks of the MRM and the MRE can be estimated (WC_DIFF). A common WC_DIFF can be calculated for either Audio or Video depending on the estimated RTT and/or arrival time of the SR.

Finally the ΔTSa or ΔTSv can be calculated as a function of the value of the wall clock in the SR, the common WC_DIFF, the clock rate of the audio and/or the video, respectively, and the difference between the MRM TSa/v reference and the timestamp audio or video, respectively, embedded in the relevant SR. The calculated values of the common WC_DIFF, the ΔTSa and ΔTSv, for each MRE or for each stream associated with the session, can be stored in a table at the session RTP processor. This table can be updated from time to time.

For each received packet from a TMRE that carries compressed media (audio or video), the session RTP processor can retrieve the value of the appropriate ΔTSa or ΔTSv and accordingly manipulate the TSa or TSv into MTSa or MTSv (respectively). The MTSa or MTSv can be placed at the header of the relayed RTP packet instead of the received TSa or TSv, respectively. The manipulated timestamps, which are embedded in the packets that are relayed from the MRM toward a RMRE, transform the capture time of the media into the MRM's timing domain. Thus, the MTSa/v expresses the capture time of the media in the MRM time domain. Due to the manipulation of the timestamps, a single sender report can be sent by the MRM to each RMRE, for each media type (one for Audio and one for Video), where that sender report is applicable to all streams of that media type. Thus, the MTSa or MTSv of each packet of each of the received streams from the plurality of TMREs appears as received from a single entity, from the intermediate node (the MRM for example).

Consequently, an RMRE that receives a plurality of selected relayed audio and video streams from the MRM can synchronize the audio and video streams before mixing the audio or composing a CP video image, by using the MTSa and MTSv within each relayed stream together with information from the sender report received from the MRM. The novel technique enables the RMREs to synchronize audio and video without requiring complicated synchronization at the MRM or being dependent on receiving the sender reports of each one of the TMREs. Thus, this technique reduces the end-to-end latency and saves computing resources at both the MRM and the RMREs, as well as reduces bandwidth consumption between the MRM and the RMREs.

In an MRC embodiment in which the audio mix is done by the MRM, for example, additional adaptations can be added. The additional adaptations enable an RMRE to synchronize a presented video stream originated from a TMRE with audio data that originated from the same TMRE, if it exists in the audio mix. An embodiment of such a system can comprise adding new fields to an RTP extended header of each packet that carries a compressed audio mix. In the new fields, an MRM may indicate the endpoints whose audio streams are included in the audio mix, and their respective manipulated timestamp (MTSa).

Another embodiment of such a system can comprise aligning at the MRM the packets of the audio streams according to their capture time, prior to mixing them. In addition, new fields may be added to an RTP extended header of each packet that carries a compressed audio mix, in which the MRM may indicate one or more endpoints whose audio is included in the audio mix. The RTP timestamp of the audio packets is the adjusted timestamp that now represents the capture time used for aligning the audio sources included in the mix, in the MRM's timing domain.

Throughout the present disclosure, an MRC system is described as relaying multiple audio and/or video streams to a receiving endpoint. Yet, the present invention similarly applies to cases where the MRC system relays only a single audio and/or a single video to the receiving endpoint. We use the multiple streams case just as an example.

These and other aspects of the disclosure will be apparent in view of the attached figures and detailed description. The foregoing summary is not intended to summarize each potential embodiment or every aspect of the present disclosure, and other features and advantages of the present disclosure will become apparent upon reading the following detailed description of the embodiments with the accompanying drawings and appended claims.

Furthermore, although specific embodiments are described in detail to illustrate the inventive concepts to a person skilled in the art, such embodiments are susceptible to various modifications and alternative forms. Accordingly, the figures and written description are not intended to limit the scope of the inventive concepts in any manner.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

Figure 1:
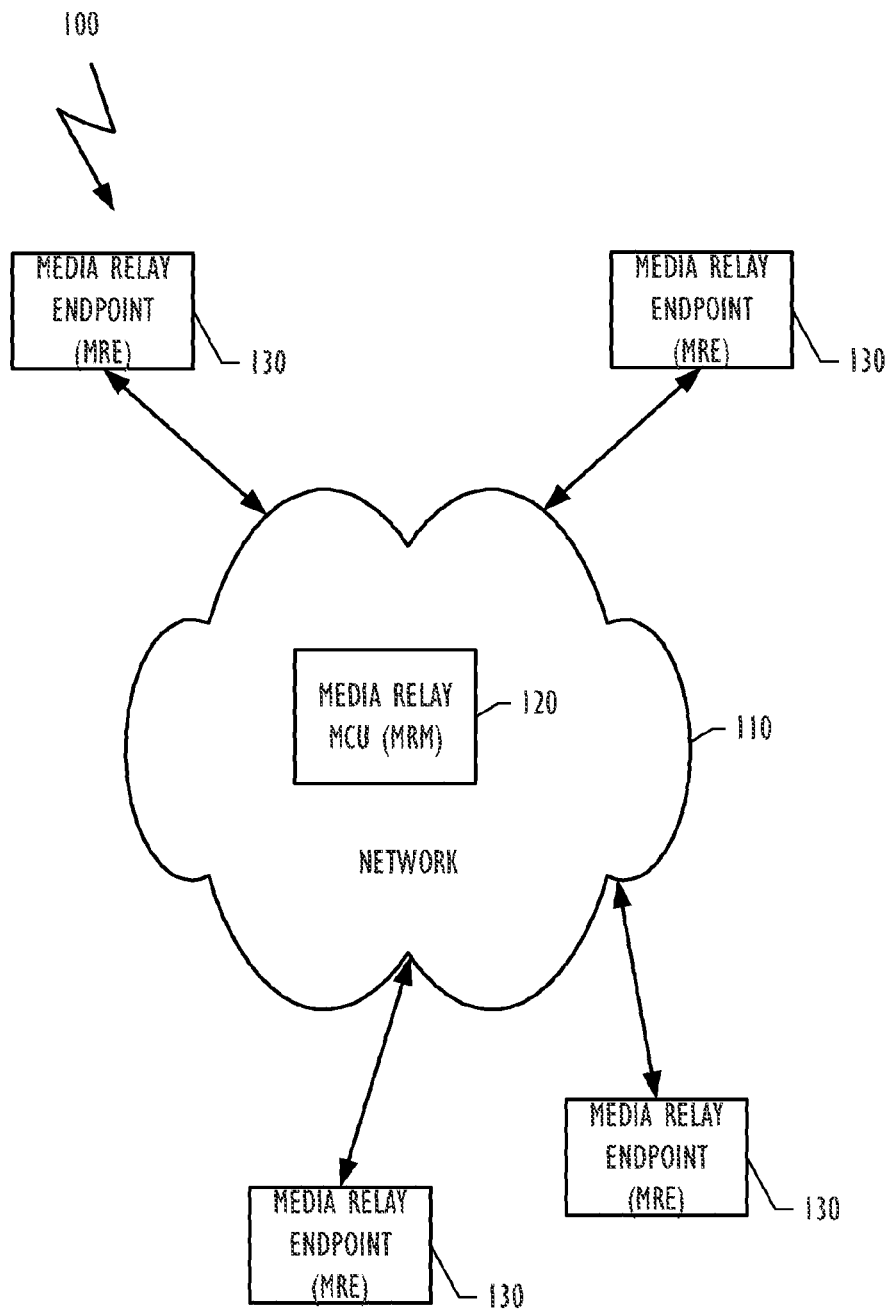
FIG. 1 illustrates a multimedia relay conferencing system comprising a variety of electronic videoconferencing systems, according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number.

As used herein, the term "a computer system" can refer to a single computer or a plurality of computers working together to perform the function described as being performed on or by a computer system.

Turning now to the figures in which like numerals represent like elements throughout the several views, embodiments of the present disclosure are described. For convenience, only some elements of the same group may be labeled with numerals. The purpose of the drawings is to describe embodiments and not for production. Therefore features shown in the figures are chosen for convenience and clarity of presentation only. Moreover, the language used in this disclosure has been principally selected for readability and instructional purposes, and may not have been selected to delineate or circumscribe the inventive subject matter, resort to the claims being necessary to determine such inventive subject matter.

Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although some of the following description is written in terms that relate to software or firmware, embodiments may implement the features and functionality described herein in software, firmware, or hardware as desired, including any combination of software, firmware, and hardware. In the following description, the words "unit," "element," "module" and "logical module" may be used interchangeably. Anything designated as a unit or module may be a stand-alone unit or a specialized or integrated module. A unit or a module may be modular or have modular aspects allowing it to be easily removed and replaced with another similar unit or module. Each unit or module may be any one of, or any combination of, software, hardware, and/or firmware, ultimately resulting in one or more processors programmed to execute the functionality ascribed to the unit or module. Additionally, multiple modules of the same or different types may be implemented by a single processor. Software of a logical module may be embodied on a computer readable medium such as a read/write hard disc, CD-ROM, Flash memory, ROM, or other memory or storage, etc. In order to execute a task a software program may be loaded to an appropriate processor as needed. In the present disclosure the terms task, method, process can be used interchangeably.

FIG. 1 illustrates a novel multimedia relay conferencing system 100, comprising a variety of novel electronic videoconferencing systems, according to one embodiment. System 100 can include a network 110, one or more intermediate nodes such as Media Relay MCUs (MRMs) 120, and a plurality of Media Relay Endpoints (MRE) 130. Network 110 can be, but is not limited to, a packet switched network, a circuit switched network, an IP network, or any combination thereof. The multimedia communication over the network can be based on communication protocols such as but not limited to H.323 or Session Initiation Protocol (SIP), for example, and may use media compression standards such as but not limited to H.263, H.264, G.711, G.719. In the disclosure, the terms data chunks and packets may be used interchangeably. A reader who wishes to learn more about the International Telecommunication Union ("ITU") standards is invited to visit the ITU website: www.itu.int. To learn more about SIP, visit the IETF website: www.ietf.org.

Each Media Relay Endpoint (MRE) 130 is capable of providing real-time, two-way audio and/or visual communication to another MRE 130 or to the MRM 120. An MRE can be a terminal of a conferee in the session, which has the ability to receive relayed compressed media (audio and video) from an MRM 120 and to deliver relay RTP compressed audio and video data chunks to the MRM 120. The relay uplink (towards the MRM 120) and relayed downlink (towards the MRE) compressed media (audio or video) data chunks can be sent as RTP compressed media data chunks. The relay uplink data chunks may be considered input data chunks for the MRM 120 and the relayed downlink data chunks may be considered output data chunks. Each MRE 130 can send relay RTP compressed audio data chunks in the appropriate required bit rate or rates and the required compression standard. Similarly, each MRE 130 can send relay RTP compressed video data chunks in the appropriate required size or sizes, bit rate or rates and the required compression standard. In some embodiments, each MRE 130 can be adapted to send an indication of its audio energy by embedding the audio energy indication in a field in the header or in an extension header of the relay RTP compressed audio data chunks.

Each MRE 130 can be associated with an MRE identifier (ID) that can be carried in a real-time transport protocol (RTP) header of a relay RTP compressed chunk of media data. In one embodiment, the ID may be randomly selected by an MRE and potentially confirmed by the MRM 120 after validating its uniqueness. In another embodiment, the ID can be allocated by the MRM 120 and conveyed to the relevant MRE 130. In some embodiments, the MRE ID can be used in conjunction with a media stream type indication, yielding a stream ID that identifies a particular stream sent by the relevant MRE. Yet, in some embodiments, the stream ID can be carried in a real-time transport protocol (RTP) header of a RTP chunk of media data, written in the Synchronization Source (SSRC) field or the Extension header of the RTP. In another embodiment, the stream ID can be carried in the Contributing Source IDs (CSRC) field in the RTP header. In an alternate embodiment, the stream ID can be written in the extension header of each relay RTP compressed media data chunk. The stream ID can enable the MRM 120 to identify the source of a received relay RTP compressed audio and/or video packet In an alternate embodiment, the relay RTP compressed audio data chunks and the relay RTP compressed video data chunks of the same MRE 130 may have unrelated IDs. In such an embodiment, the IP address and the IP port where the relay RTP compressed audio and/or video data chunks are received on the MRM 120 can be used for identification instead of an ID number.

In one embodiment, according to the received audio energy of each conferee (MRE 130), the MRM 120 can determine which conferees will be presented in a CP image in a period of the session. The MREs 130 with the highest audio energy can be selected, presented, and heard for a future given period of time, for example. MRM 120 can further determine which of the displayed conferees will be displayed in the speaker segment in the layout. In an alternate embodiment, each MRE 130 can determine which conferees will be presented in the layout and in which segment. In such embodiments, the MRE 130 user can use a user interface method to select the presented conferees, such as but not limited to the click and view method, which is disclosed in U.S. Pat. No. 7,542,068.

Some examples of an MRE 130 can decode the received relayed RTP compressed video streams originated from the selected conferees and display each image in the appropriate layout segment. MRE 130 can decode the received relayed RTP compressed audio streams originated from the selected conferees, mix the different decoded audio streams and transfer the mixed audio to the MRE 130 loudspeakers. In the other direction, the MRE 130 can deliver relay RTP compressed audio and video data chunks towards the MRM 120.

Other examples of MREs 130, may suffer from lack of processing capabilities, lack of support of audio relay codec, or bandwidth limitations, for receiving a plurality of audio streams, decode and mix them into a single stream. In such a case, sending from the MRM 120 a single compressed mixed audio stream that includes the mix of multiple audio streams from top active speakers is preferable, for example, while the video streams of selected MREs are sent separately to a receiving MRE that decodes and composes the decoded streams into a CP video image.

At an RMRE 130, synchronization of the audio and video is needed in order to properly present the CP video image and play the relevant audio streams in sync. In an embodiment of MREs 130 that is capable of receiving a plurality of audio streams, decoding, and mixing them, synchronization of the audio and video streams received from the same TMRE via the MRM 120 can be done based on the MTSa, MTSv and the SR received from that MRM. In spite of using the manipulated timestamps, the common RFC 3550 technique can be used for synchronizing the audio and video.

In some MRC systems, the MRM 120 may align the audio streams received from a plurality of TMREs, according to their capture time prior to mixing them. Thus, a single MTSa can reflect the common capture time of the mixed audio carried in a compressed audio data packet sent by the MRM 120. In such an MRC system, an RMRE 130 can synchronize between each audio signal in the mix and its associated video stream based on the MTSv that is written in the RTP header of a packet that carries the compressed video stream together with the MTSa carried by the RTP header of a packet that carries data of the mixed audio. Thus, the video images in the CP video image can be from the same common capture time and lip-synced with the audio mix.

In another embodiment of such an MRC system, additional information can be placed in the RTP extension header of the compressed mixed audio packets, comprising a list of IDs of the TMREs whose audio is included in the audio mix. Based on the ID field, a relevant presented video stream can be selected, and its MTSv together with the common MTSa can be used for synchronizing the video image received from that the relevant TMRE and the audio data received from the same TMRE, which is currently in the mixed audio. In a similar way, each audio data in the mix can be lip-synced with its video image. Thus, the video images in the CP video image can be from different capture times, but each of them is lip-synced with the audio received from the same TMRE and currently in the audio mix.

In some MRC systems, the MRM 120 does not align the audio streams received from a plurality of TMREs according to their capture time prior to mixing them. In such an MRC system, an RMRE 130 can synchronize between each audio signal in the mix and its associated video stream based on the MTSv that is written in the RTP header of a packet that carries the compressed video stream together with additional information carried by the RTP extension header of a packet that carries data of the mixed audio.

That additional information can be arranged in a list of pairs. Each pair can be associated with an audio stream that is currently in the mixed audio data carried by that packet. Each pair can comprise a field indicating an ID pointing to the TMRE that originated that audio and a field indicating the MTSa of that audio. Based on the ID field, a relevant presented video stream can be selected, and its MTSv together with the MTSa can be used for synchronizing the video image received from that the relevant TMRE and the audio data received from the same TMRE, which is currently in the mixed audio. In a similar way, each audio data in the mix can be lip-synced with its video image. Thus, the video images in the CP video image can be from different capture times, but each one of them is lip-synced with the audio received from the same TMRE and currently in the audio mix.

One embodiment of an MRM 120 can conduct a plurality of multimedia multipoint conferences, each involving a plurality of MREs 130. Further, an example of a MRM 120 can be configured to allocate and release resources dynamically according to the current needs of each conferee and the session. An example of an MRM 120 can have a centralized architecture and can be located in an intermediate node of network 110 between the pluralities of MREs 130.

An embodiment of MRM 120 can be configured to take part in the synchronization process. An example of such an MRM 120 can manipulate the timestamp of each received packet (TSa or TSv) by a value ($\Delta$TSv or $\Delta$TSa respectively). The manipulated timestamp (MTSa or MTSv respectively), which is sent from the MRM 120 toward the RMRE 130 in the relayed RTP compressed packet header, causes the received timestamps (A/V) to appear as if they were coming from the MRM 120. Thus, the MTSa or MTSv of each packet of the relayed streams received at the RMREs 130 originated from the plurality of TMREs 130 appears as originated from a single entity, the intermediate node (the MRM 120 for example). More information on example embodiments of an MRM 120 is disclosed below in conjunction with FIGS. 2, 3A, 3B, and 4.

Figure 2:
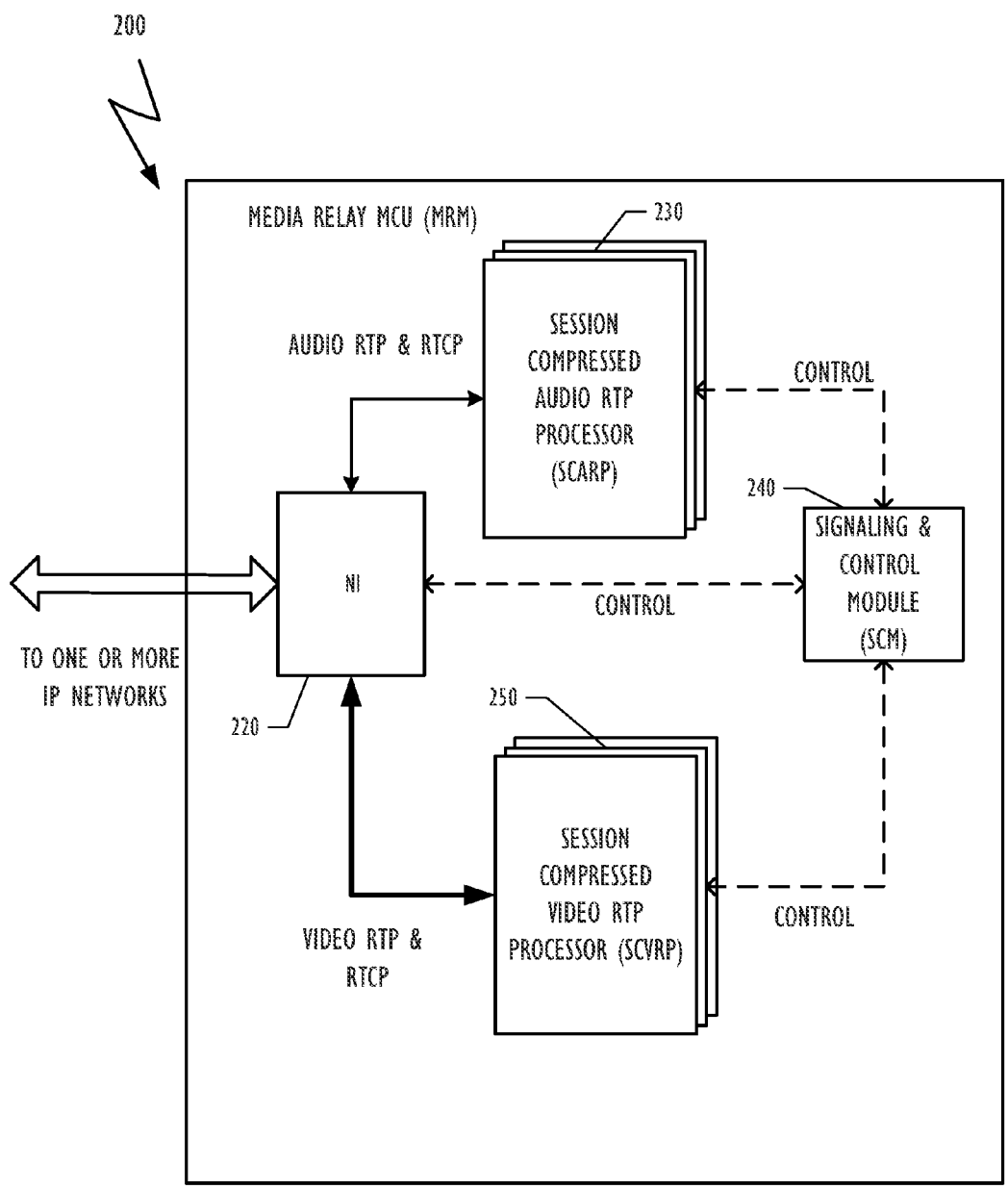
FIG. 2 depicts a block diagram with relevant elements of an MRM according to one embodiment.

FIG. 2 depicts a block diagram with relevant elements of one embodiment of an MRM 200. The MRM 200 may include a network interface module (NI) 220, one or more Session Compressed Audio RTP Processors (SCARPs) 230, one or more Session Compressed Video RTP Processors (SCVRPs) 250, and a Signaling and Control Module (SCM) 240. In an alternate embodiment, an MRM 200 may include one or more SCMs 240, one for each session. In some embodiments of an MRM 200, the SCARPs 230 and the SCVRPs 250 can have similar modules that are configured to manipulate the relevant stream, with respect to audio-video synchronization. Those modules are referred as Session Compressed Media RTP Processors (SCMRPs), and are further described below in conjunction with FIG. 3A. Some SCMRPs can be configured to handle the RTP streams that carry compressed audio (SCARP 230) and some of them can be configured to handle the RTP streams that carry the compressed video (SCVRP 250). In order to adapt the SCMRP to handle a media type an appropriate wall clock and timestamp clock can be provided.

In an alternate embodiment, an MRM 200 may be configured to deliver compressed mixed audio to a plurality of RMREs 130. In such an embodiment, the functionality of the SCARP 230 and the video SCVRP 250 can be provided by a session compressed audio and video RTP processor (SCAVRP), such as the one illustrated in FIG. 3B.

The NI 220 can communicate with a plurality of video conferencing devices such as MREs 130 via network 110. NI 220 can parse the communication according to one or more communication standards, such as but not limited to H.323 and SIP. Furthermore, the NI 220 may process the physical layer, data link layer, network layer and the transport layer (UDP/TCP layer) of the communication. NI 220 can receive and transmit control and data information to/from internal modules of the MRM 200 and MREs 130 or other nodes (not shown in the drawings). NI 220 multiplexes/de-multiplexes the different signals and streams communicated between the MREs 130 and the internal modules of the MRM 200.

RTP packets of compressed audio and RTCP reports (SR or RR or compound RR/SR) can be transferred via NI 220 to and from the MREs 130 and the appropriate SCARPs 230, respectively. Each SCARP 230 can be associated with a conferencing session. NI 220 can determine which conferencing session an MRE 130 is taking part in according to the MRE 130's packet source and/or destination IP address and port and/or ID thus enabling the NI 220 to determine to which SCARP 230 to transfer audio packets received from the MRE 130, and vice versa.

RTP packets of compressed video and RTCP reports (SR or RR or compound RR/SR) can be transferred via NI 220 to and from the MREs 130 and the appropriate SCVRPs 250, respectively. Each SCVRP 250 can be associated with a conferencing session. NI 220 can determine in which conferencing session an MRE 130 is taking part according to the MRE 130's packet source and/or destination IP address and port and/or ID, thus enabling the NI 220 to determine the SCVRP 250 to which video packets received from an MRE 130 should be transferred, and vice versa.

NI 220 can also transmit and receive signaling and control data to and from SCM 240 and MREs 130. An alternate embodiment can have more than one signaling and control module (SCM) 240, including one for each session, for example.

For each conferencing session that MRM 200 is handling, a SCARP 230 can be allocated to handle the session audio. A SCARP 230 can obtain relay RTP compressed chunks of audio data (header and payloads) via NI 220 from MREs 130 that are taking part in the session. RTCP SR and RR reports can also be sent or obtained by SCARP 230. In addition the SCARP 230 can receive from SCM 240, via the control bus, the MRM 200 wall clock, and the MRM 200 RTP audio clock for audio streams. For audio streams that are handled by the SCARP 230, one or more counters can be allocated for creating the MRM 200 TSa. The MRM 200 RTP audio clock can be used as the clock of an allocated counter. A counter can be initiated with a random number and can run in a cyclic mode.

Based on the MRM 200 wall clock and the MRM 200 TSa a SCARP 230 can be configured to manipulate the audio timestamp that is received in each RTP packet. The MTSa expresses the received audio timestamp, at the RMRE 130, to appear as coming from the MRM 200's timing domain. Thus, the MTSa of each packet of each of the received streams from the plurality of TMREs 130 appears as received from a single entity, the intermediate node (the MRM 200 for example). Thus, every few seconds, five seconds for example, an SCARP 230 can send a single RTCP audio SR to each of the RMREs, instead of sending a plurality of SRs where each relates to one TMRE 130.

Periodically, for example, each several tens of milliseconds, SCARP 230 can select a group of relay RTP compressed streams of audio chunks to be heard and thus be relayed toward the RMREs 130. The selection can be based on comparing the audio energy or the average energies associated with the received streams or based on voice activity detection (VAD). Alternatively, the selection can be based on a command received from the SCM 240. The number of selected relay RTP compressed streams depends on the audio mixing capabilities of the MREs 130. In some embodiments, the number of selected streams can be configured by a conferee.

SCARP 230 can also select one of the TMREs 130 as the main speaker (the one that will be displayed in the largest layout segment, for example) and accordingly forward signaling and control information to the SCM 240. The main speaker can be the one with the highest audio energy and/or VAD indication for a certain percentage of the heard-streams-selection intervals over a period of time. In an alternate embodiment, SCARP 230 can forward the information on the audio energies and VAD of the MREs 130 to SCM 240. The SCM 240 will select the main speaker and group of RTP compressed streams of audio data that will be heard (mixed), and send signaling and control data to the appropriate SCARP 230 and SCVRP 250. In some embodiments, information on the selected group of conferees and/or main speaker is transferred also to the MREs 130. According to signaling and control data sent from SCM 240, SCARP 230 can manipulate the TSa of the relay RTP compressed audio chunks of the selected group into MTSa and relay them to the appropriate RMREs 130 via NI 220 as relayed compressed audio data chunks. More information on an example of SCARP 230 is disclosed below in conjunction with FIG. 3A.

For each conferencing session that MRM 200 is handling, a SCVRP 250 can be allocated to handle the session video. An example of a SCVRP 250 can obtain relay RTP compressed chunks of video data (header and payloads) via NI 220 from MREs 130 that are taking part in the session. RTCP SR and RR reports can also be sent or obtained by the SCVRP 250. In addition, the SCVRP 250 can receive from SCM 240, via the control bus, the MRM 200 wall clock, and the MRM 200 RTP video clock for video streams. For video streams that are handled by the SCVRP 250, a counter can be allocated for creating the MRM 200 TSv. The MRM 200 RTP video clock can be used as the clock of an allocated counter. A counter can be initiated with a random number and can run in a cyclic mode.

Based on the MRM 200 wall clock and the MRM 200 TSv, an SCVRP 250 can be configured to manipulate the video timestamp that is received in each RTP packet. The MTSv expresses the received video timestamp, at the RMRE 130, to appear as coming from the MRM 200's timing domain. Thus, the MTSv of each packet of each of the received streams from the plurality of TMREs 130 appears as originated from a single entity, the intermediate node (the MRM 200 for example). Thus, every few seconds, for example, every five seconds, an SCVRP 250 can send a single RTCP video SR to each of the RMREs 130 instead of sending a plurality of SRs where each relates to one TMRE 130.

Periodically, for example, every several seconds, SCVRP 250 can select a group of relay RTP compressed streams of video chunks to be presented and thus be relayed toward the RMREs 130. The selection can be based on a command received from the SCM 240. The number of selected relay RTP compressed streams and their video parameters for each RMRE 130 may depend on the CP layout that is used in that RMRE 130, for example. More information on the operation of SCVRP 250 and SCARP 230 is disclosed below in conjunction with FIG. 3A and FIG. 4.

Some embodiments of MRM may not have SCARP 230 and SCVRP 250. Instead, such an MRM may have a Session Compressed Audio and Video RTP Processor (SCAVRP) 300B. The audio section of such an SCAVRP 300B can be configured to decode the received compressed audio streams, analyzes the decoded streams for determining which conferee will be selected as the main speaker and which conferees will be selected to be heard in the conference and/or presented in a CP video layout. Then the decoded audio of the selected conferees are mixed and the mixed audio can be compressed and embedded in RTP packets. More information on the SCAVRP 300B is disclosed below in conjunction with FIG. 3B.

An example of SCM 240 can control the entire operation of the MRM 200. The SCM 240 can initiate conferencing sessions (reserved or impromptu) and set the connections with the endpoints. Based on the needs of a session, SCM 240 can determine the properties of the session and the endpoints are set accordingly. The SCM 240 can also allocate resources to the internal modules of MRM 200 and can allocate ID numbers to each stream of RTP compressed audio/video.

From time to time, SCM 240 can obtain information on the audio energy of each relay RTP compressed audio stream of data chunks and accordingly select a new speaker and the video sources to be presented on each endpoint. Based on those selections, instructions are given to SCARP 230 and SCVRP 250. SCM 240 can also notify the one or more RMREs 130 regarding changes in the conference speaker, the number of conferees, the media streams they contribute, and the status of the conferees.

In addition, the SCM 240 may include one or more timing modules which can be used in order to assist the synchronization process between audio and video streams. The timing modules of SCM 240 may comprise a wall clock, one or more clocks for audio streams, and one or more clocks for video streams. The wall clock can deliver pulses at a rate of million pulses per second, for example. The one or more audio clocks can deliver pulses at a rate of several thousands to several tens of thousands of pulses per second, 8,000 to 64,000 pulses per second, for example. The one or more video clocks can deliver pulses at a rate of several tens of thousands of pulses per second, 90,000 pulses per second, for example. The relevant clock pulses can be distributed over the control bus to the appropriate SCARP 230 and SCVRP 250. More information on MRMs is disclosed below in conjunction with FIGS. 3A, 3B, and 4.

Figure 3A:
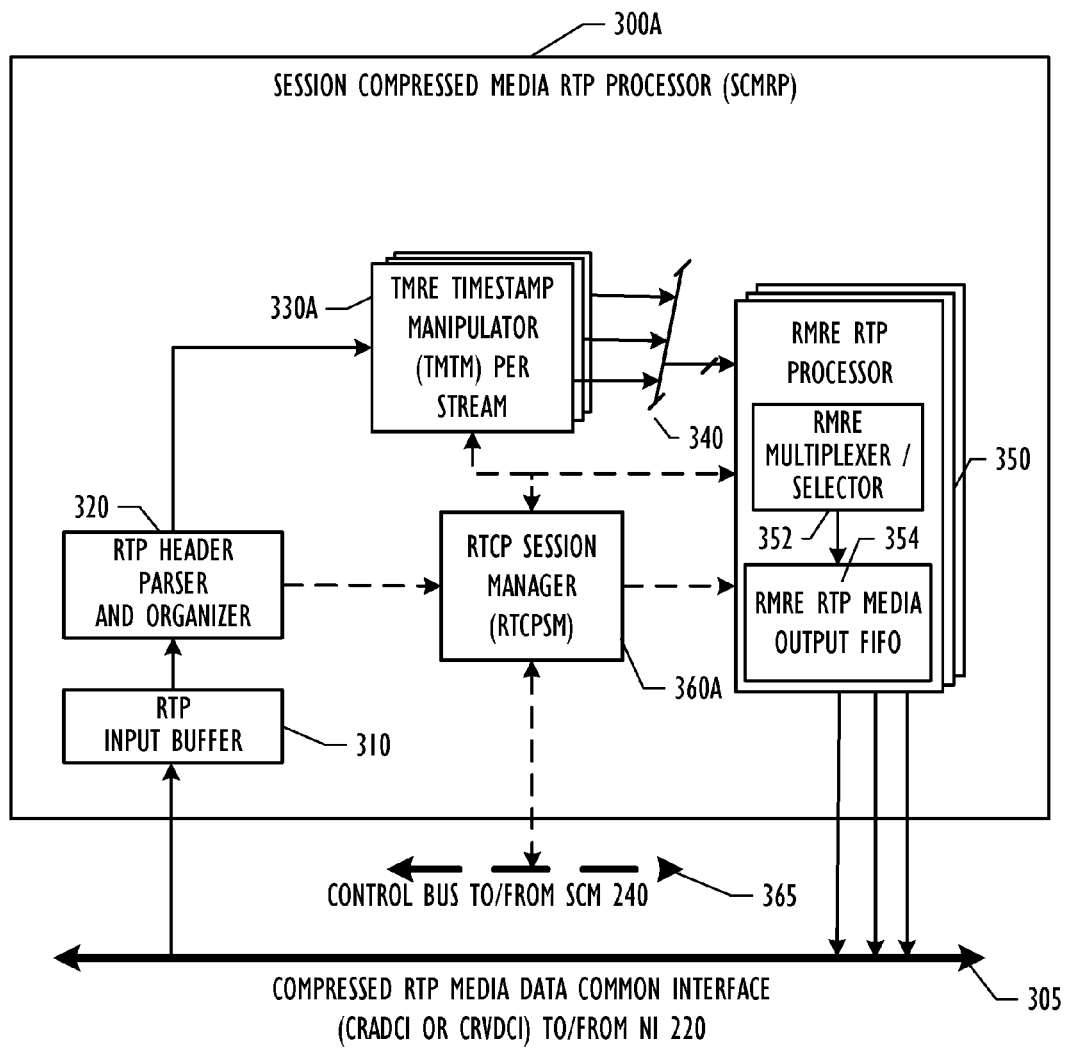
FIG. 3A is a simplified block diagram with relevant elements of a session compressed media RTP processor that implements example techniques and elements where audio mixing is done by the RMRE.

FIG. 3A is a simplified block diagram with relevant elements of an example of a SCMRP 300A that implements techniques and elements of different embodiments of audio and video synchronization, in which the audio mix is done by the RMREs 130. SCMRP 300A can be configured to handle audio streams and act as an SCARP 230. Alternatively, SCMRP 300A can be configured to handle video streams and act as an SCVRP 250, for example. An example of SCMRP 300A may include an RTP input buffer 310, an RTP header parser and organizer 320, a plurality of TMRE 130 timestamp manipulator (TMTM) 330A one for each media stream (audio or video) received from each TMRE 130, a bus 340, a plurality of RTP processors 350, and an RTCP session manager (RTCPSM) 360A. SCMRP 300A can be controlled by SCM 240 via a control bus 365, which can be an internal bus or a shared memory, for example. SCMRP 300A input and output media can be connected to NI 220 via a compressed RTP media data common interface (CRMDCI) 305 for receiving and transmitting compressed audio or video data chunks. CRMDCI 305 can be an internal bus, or a shared memory.

Each SCMRP 300A can be assigned to handle the audio or video of a CP conference session handled by MRM 200. An SCMRP 300A RTP input buffer 310 can obtain from the CRMDCI 305, the relay RTP compressed media (audio or video depending on the present configuration of SCMRP 300A) data chunks received from the TMREs 130 that participate in the session. In one embodiment, the RTP input buffer 310 can determine which relay RTP compressed media data chunk to collect from CRMDCI 305 by using the ID number in the relay RTP header. In an alternate embodiment, RTP input buffer 310 can receive the relay RTP compressed media data chunks from NI 220 based on the source and/or destination IP address and port number of the received relevant packet.

An RTP header parser and organizer 320 can extract the relay RTP compressed media data chunks from RTP media input buffer 310 and parse the header of the relay RTP compressed data chunk for determining the TMTM 330A to which the obtained RTP packet should be routed. The decision can be based on the ID field of the RTP header, for example. In addition RTCP messages such as SR and RR received from each one of the TMREs 130 can be routed toward the RTCPSM 360A. In some embodiments, the RTCP messages can also be transferred to the relevant TMTM 330A.

Each TMTM 330A can be associated with a certain media stream received from a TMRE 130. The media can be audio or video depending on the present configuration of the SCMRP 300A. An example of TMTM 330A can manipulate the timestamp that is embedded in the RTP header of each received relay RTP compressed media data chunk of the relevant received media stream. The manipulation transforms the capture time of the media from the time domain of the TMRE 130 into the time domain of the MRM 200.

Upon establishing with a TMRE 130 a connection that carries a new stream of media, a TMTM 330A can be allocated and initiated by RTCPSM 360A. After initiation, the RTCPSM 360A can load to the TMTM 330A the value of the calculated $\Delta TSa$ or $\Delta TSv$ (audio or video, respectively). After obtaining the $\Delta TSa$ or $\Delta TSv$ values, the header of each received relay RTP compressed media data chunk is parsed and the field of the TSa or TSv is converted into a manipulated timestamp value, MTSa or MTSv, respectively. The MTSa can be calculated to be the received TSa minus the obtained $\Delta TSa$, ($MTSa=TSa-\Delta TSa$). The MTSv can be calculated to be the received TSv minus the obtained $\Delta TSv$, ($MTSv=TSv-\Delta TSv$).

The relay RTP compressed media data chunk with the MTSa or MTSv can be transferred via a buffer toward bus 340 and from bus 340 to one or more RTP processors 350. Each one of those one or more RTP processors 350 can be associated with one or more RMREs 130 that need to mix and play the relayed audio and/or video streams. Bus 340 can be a shared memory, wherein each TMTM 330A can be configured to store the manipulated relay RTP compressed media data chunk, with the MTSa or MTSv, in a certain interval of addresses in a cyclic mode. In a similar way, each the RTP processors 350 can be informed about the addresses intervals that were allocated to each one of the TMTMs 330A and accordingly can select and fetch the appropriate manipulated media streams.

In other embodiments of SCMRP 300, the bus 340 can be a TDM bus, for example. In such embodiment each TMTM 330A can be configured to transfer to the bus 340 the manipulated relay RTP compressed media data chunks in a certain time slot. In a similar way each one of the RTP processors 350 can be informed about the time slots that were allocated to each one of the TMTMs 330A and accordingly can select and fetch the appropriate manipulated media streams.

Each RTP Processor 350 can be assigned to one or more RMREs 130. An RTP Processor 350 can comprise a multiplexer/selector 352 and an RTP media output FIFO 354. The multiplexer/selector 352 can select a group of one or more streams of manipulated compressed media relay data chunks by selecting the output of one or more TMTM 330A via bus 340. The group selection can be based on control signals received from RTCPSM 360A. In some embodiments, the selection can be based on the current activity in the session. The current activity can be determined based on the audio energy of each TMRE 130 with or without using a VAD indication. Alternatively, the selection can be based on user selection of one or more specific sources independent of their current activity. The number of the selected TMTMs 330A can depend on the mixing capabilities of the RMRE 130, for audio streams; the current used layout of the CP image presented in that RMRE 130 for video streams; or a conferee's instruction, for example. Usually, the group of the selected sources for an MRE 130 does not include its own media stream. In an alternate embodiment, the multiplexer/selector 352 can receive control signals from the relevant RMRE 130 regarding which TMREs 130 to select. Furthermore, from time to time the multiplexer/selector 352 can change its selection of inputs according to real-time changes in the conference.

The selected streams of converted relay RTP compressed media data chunks (with the MTSa or MTSv) can be multiplexed into one relayed RTP compressed media data stream, which is sent to the RTP media output FIFO 354 and from there is transmitted towards the appropriate one or more RMREs 130 via CRMDCI 305 and NI 220. Each of the transmitted relayed RTP compressed media data chunks that is transmitted from the RTP processor 350 over the CRMDCI 305 has a manipulated timestamp (MTSa or MTSv) which expresses the capture time of the media (audio or video) in the MRM 200's time domain.

An alternate embodiment (not shown in the drawing) of the RTP Processor 350 can include a group of selectors. Each selector is connected to the bus 340 and can select the output of one of the TMTMs 330A. The other port of the selector can be connected via a FIFO to the CRMDCI 305. In such embodiment, the selected media streams are sent towards the MREs as a plurality of streams of relayed RTP compressed media data chunks.

In an alternate embodiment, an RTP Processor 350 can be used to serve a group of conferees that participate in a conference session, wherein all relevant RMREs 130 will receive the same selection of streams of relayed RTP compressed media data chunks.

During the establishing stage of a multimedia conferencing session, SCM 240 can allocate the resources of SCMRP 300A and initiate the RTCPSM 360A. An embodiment of RTCPSM 360A can manage the operation of SCMRP 300A. The RTCPSM 360A may execute the common operation of an RTCP manager; such as sending and receiving RTCP messages (SR, RR for example). The common operation is well known in the art and will not be further disclosed. After the initiation, SCM 240 can route toward the relevant RTCPSM 360A, over the control bus 365, the one or more clock pulses of the wall clock and the media clock (audio or video). The wall clock pulses can be at a rate of million pulses per second, for example. The one or more audio clock pulses can be at a rate of thousands of pulses per second, 8,000 to 64,000 pulses per second, for example. The one or more video clock pulses can be at a rate of tens of thousands of pulses per second, 50,000 to 150,000 pulses per second, for example. In alternate embodiment the RTCPSM 360A may comprise one or more pulse generators for each media.

For each new stream of media, audio, or video, of a conferee that joins the session, a TMTM 330A is allocated. In addition, RTCPSM 360A can initiate the new-stream-adaptation process 400 that is disclosed below in conjunction with FIG. 4. The new stream adaptation process is used for determining the value of ΔTSa or ΔTSv that is relevant for that stream (audio or video), with an appropriate rate. The clock rate matches the RTP clock rate used for the received stream. The value of the calculated ΔTSa or ΔTSv is loaded into the appropriate TMTM 330A. In some embodiments of an SCMRP 300A, the RTCPSM 360A can be configured to execute method 400 periodically, every several tens of minutes for example, in order to adjust the calculated ΔTSa or ΔTSv to fix compensating clock drifts, for example.

An embodiment of RTCPSM 360A can comprise a plurality of counters. One counter can be assigned to monitor the wall clock for the media type of that SCMRP 300A. Other counters can be assigned to deliver the TSa or TSv. Those counters can be sampled at the appropriate time, in order to deliver the pairs of values of <A WC_REF> (Audio wall clock reference value) with <A TS_REF> (Audio TS reference value); and <V WC_REF> (Video wall clock reference value) with <V TS_REF> (Video TS reference value). More information on the operation of RTCPSM 360A is disclosed below in conjunction with FIG. 4.

Figure 3B:
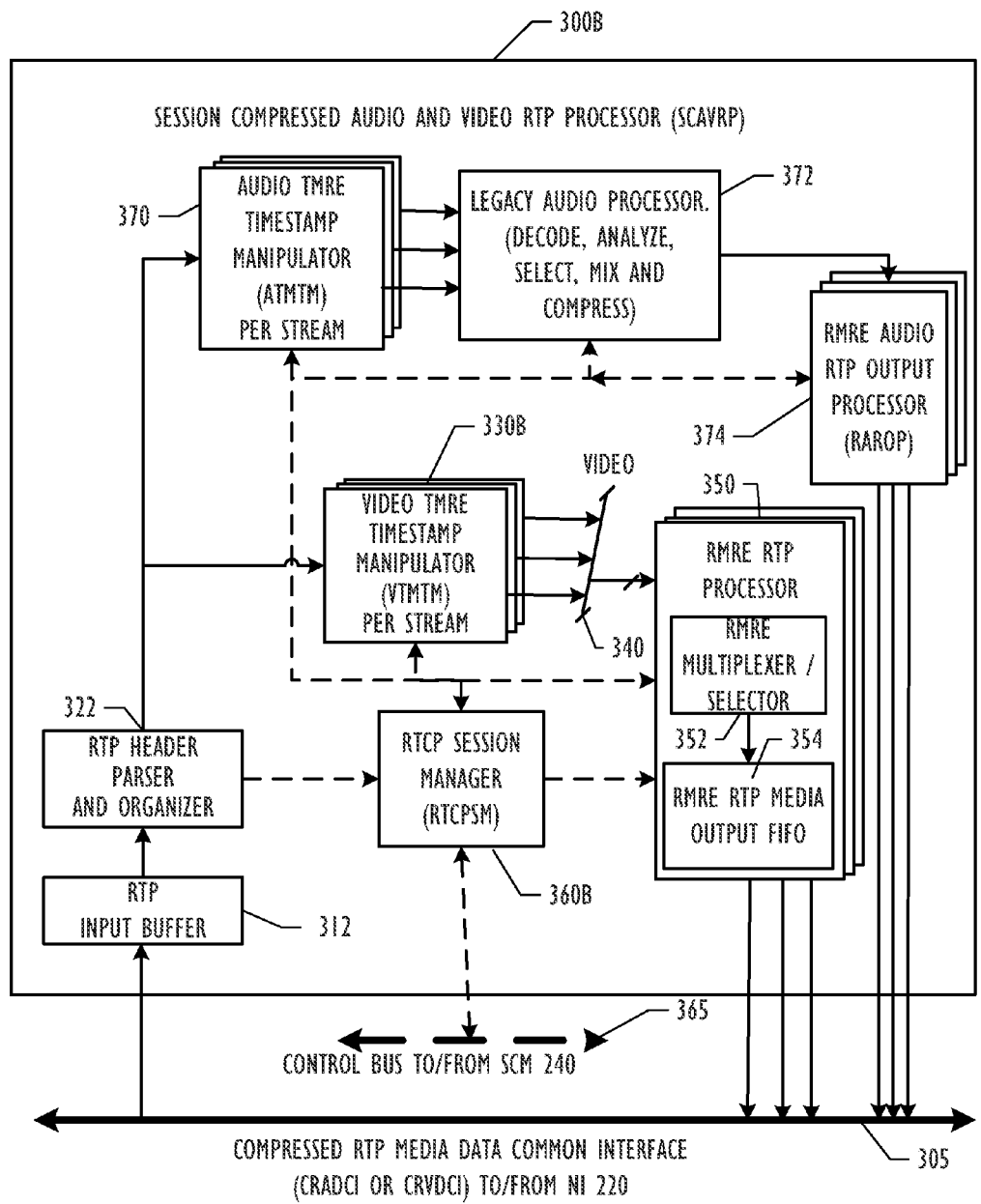
FIG. 3B is a simplified block diagram with relevant elements of a session compressed audio and video RTP processors that implements example techniques and elements where audio mixing is done by the MRM.

FIG. 3B is a simplified block diagram with relevant elements of an example of a session compressed audio and video RTP processor (SCAVRP) 300B that implements techniques and elements of different embodiments of audio and video synchronization, in which the audio mix is done by the MRM 120. SCAVRP 300B can deliver video streams to be composed and displayed by an RMRE 130 and mixed audio data to be played by the RMRE 130. SCAVRP 300B enables synchronization between video originated from a TMRE 130 presented in a CP layout and the audio originated from same TMRE 130 if included in the mixed audio.

An SCAVRP 300B may include an RTP input buffer 312, an RTP header parser and organizer 322, a plurality of video TMRE timestamp manipulators (VTMTMs) 330B one per each video stream received from each TMRE 130, a bus 340, a plurality of RMRE RTP processors 350, and an RTCP session manager (RTCPSM) 360B. In addition an SCAVRP 300B can comprise a plurality of audio TMRE timestamp manipulators (ATMTMs) 370, one per each audio stream received from each TMRE 130, a legacy audio processor 372, and one or more RMRE audio RTP output processors (RAROPs) 374. Each RAROP 374 can be associated with one or more RMREs 130.

Elements of the plurality of VTMTMs 330B, the bus 340, and the plurality of RMRE RTP processors 350 can be configured to perform similar functionality as relevant elements of SCMRP 300A (FIG. 3A), which has been configured to handle video streams, and therefore will not be further discussed.

Embodiments of the RTP input buffer 312 and the RTP header parser and organizer 322 handle RTP packets that carry compressed video and audio in a similar way as corresponding elements of SCMRP 300A (310 and 320 respectively). An example RTP input buffer 312 can obtain the relay RTP compressed audio or video data chunks from the CRMDCI 305, received from the TMREs 130 that participate in the session. The RTP input buffer 312 can determine which relay RTP compressed media data chunks to collect from CRMDCI 305 by using the ID number in the relay RTP header, for example. In an alternate embodiment, RTP input buffer 312 can receive the relay RTP compressed media data chunks from NI 220 based on the source and/or destination IP address and port number of the received relevant packet.

An embodiment of RTP header parser and organizer 322 can extract the relay RTP compressed media data chunks from RTP media input buffer 312 and parse the header of the relay RTP compressed data chunks for determining to which ATMTM 370 or VTMTM 330B to route the obtained RTP packet. The decision can be based on the type of media (audio or video) and/or the ID field of the RTP header, for example. In addition, RTCP messages such as SRs and RRs received from each one of the TMREs can be routed toward the RTCPSM 360B. In some embodiments, the RTCP messages can also be transferred to the relevant VTMTM 330B or ATMTM 370.

Each ATMTM 370 can be associated with a certain audio stream received from a TMRE 130. An ATMTM 370 can manipulate the TSa that is embedded in the RTP header of each received relay RTP compressed audio data chunk of the relevant received audio stream into MTSa of that data chunk. The manipulation transforms the capture time of the audio from the time domain of the TMRE into the time domain of the MRM. The time stamp handling of ATMTM 370 and VTMTM 330B is disclosed above in regards to TMTM 330A in FIG. 3A and will not be further described.

In a possible embodiment of MRM 120, the MTSa as well as the related stream ID of each received RTP compressed audio data chunk can be stored in a memory device and a pointer to the relevant address of the memory device can be associated as metadata to that audio data chunk along the decoding, mixing, and compressing actions.

The MTSa and the stream ID can be transferred in association with the payload (compressed audio) of the RTP packet from each ATMTM 370 toward the legacy audio processor 372. In the legacy audio processor 372, each compressed audio stream from the plurality of payloads from the plurality of ATMTMs 370 can be decoded by an associated decoder. The decoded audio of each stream can be analyzed in order to select: two or more audio streams to be mixed; the TMREs 130 to be presented in the next CP video image; and the conferee that will be presented as the current speaker. The ID of the selected streams can be transferred toward the RTCPSM 360B. The techniques of audio decoding and audio analyzing of a plurality of audio streams are well known in the art of video conferencing and will not be further described.

Next, the selected audio streams can be mixed into a mixed audio. The mixed audio can be compressed into chunks of compressed mixed audio. A list of pairs can be prepared. Each pair can comprise the ID of a selected audio stream that its audio is included in the compressed mixed audio data chunk, and the MTSa that was calculated by the relevant ATMTM 370 related to that selected audio data chunk. The list of pairs (ID; MTSa) can be associated with the chunk of compressed mixed audio and be transferred together toward one or more RAROP 374.

Each RAROP 374 can be assigned to one or more RMREs 130. In one embodiment, an RAROP 374 can convert the obtained chunk of compressed mixed audio into a payload of an RTP packet and add the relevant RTP header corresponding to the associated one or more RMREs 130. In addition, the list of the pairs of stream ID and MTSa, which reflect each of the plurality of the data streams that are mixed in that chunk of compressed mixed audio, can be added to appropriate fields in the extension of the RTP header. Next, the chunk of compressed mixed audio and the extension RTP header can be transmitted towards the appropriate one or more RMRE 130 via CRMDCI 305 and NI 220. As used herein, the terms a set, a group, a couple, or a pair of an audio stream ID and an MTSa can be used interchangeably.

In some embodiments of RAROP 374 the list of pairs can be divided into two lists. A first list can comprise the IDs of the TMREs 130 that contribute to the mix audio. The second list can be a matching list of the MTSa of the audio packets whose payload is included in the mix. In an alternate embodiment of RAROP 374, the list of MTSa can be represented in a compact manner as deltas from a common MTSa. Thus, fewer bits are needed for presenting the list of MTSa values.

In another embodiment of legacy audio processor 372, the decoded audio streams may be organized according to their MTSa (reflecting their capture time in the MRMs time domain), prior to mixing them. In such embodiments, the list of pairs may be eliminated, and be replaced by the single MTSa, which now represents the manipulated capture time of the streams included in the mix. In such embodiment, SCAVRP 300B enables synchronization between video originated from any TMRE presented in a CP layout with the mixed audio, regardless if its audio is included in the mixed audio.

Figure 4:
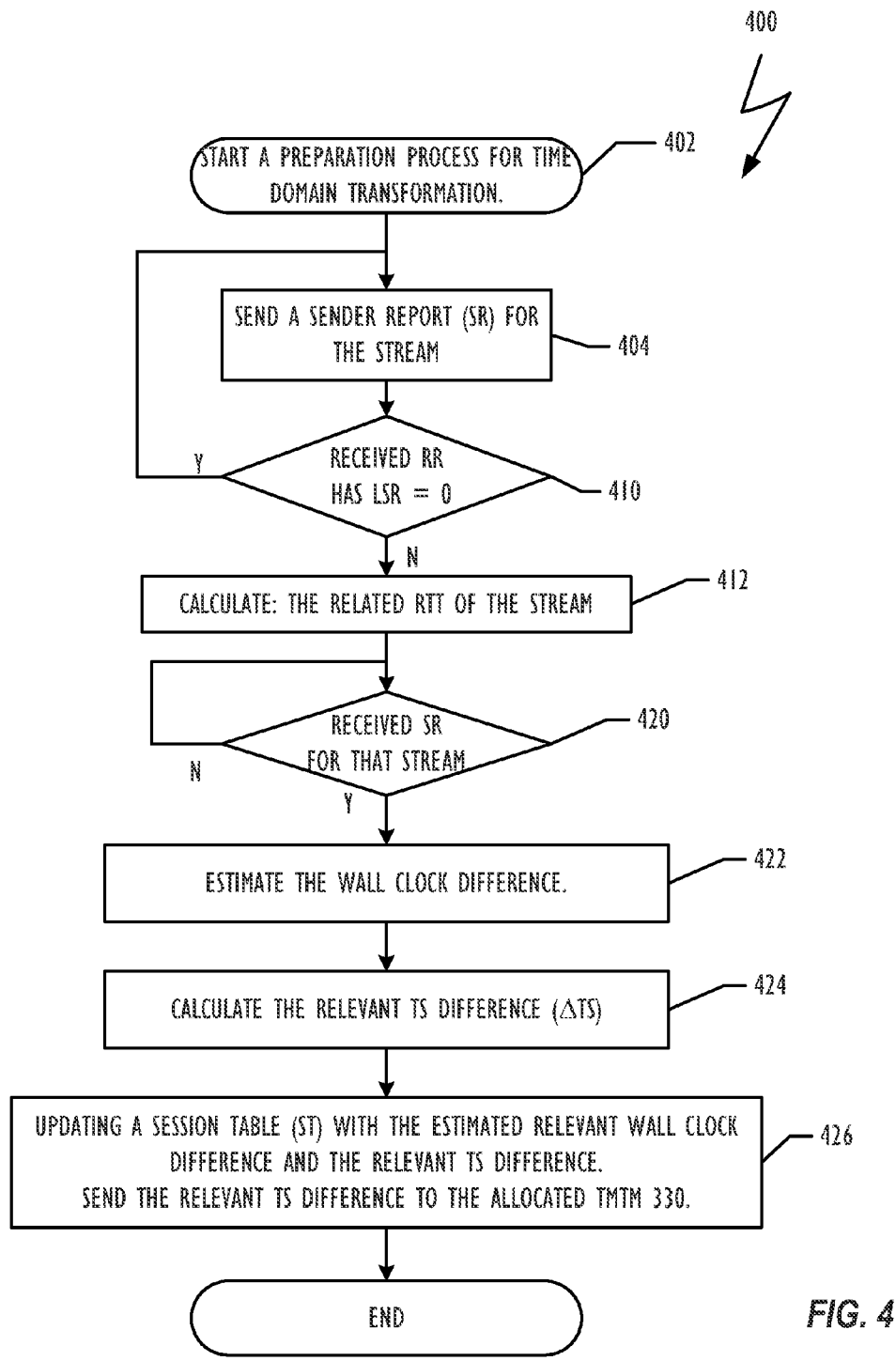
FIG. 4 is a flowchart illustrating relevant actions of a method for preparing parameters that are used to transform timestamps of each received packet of a stream into the MRM time domain.

FIG. 4 illustrates a flowchart with relevant actions of an embodiment of a method 400 for preparing parameters that are needed in order to transform the timestamp of each received packet of a stream into the MRM 200 time domain. The parameters can comprise the difference between the wall clock of the MRM 200, which is relevant to that stream (audio, video, etc.), and a wall clock in the RTCP messages related to that stream; another parameter can be the timestamp delta ($\Delta$TSa/v). The timestamp delta can be used for transforming, at the MRM 200, the TSa/v of each received packet, of that stream, into the time domain of the MRM 200 before transmitting the packet as a relayed packet toward an RMRE 130. Process 400 can be initiated 402 at the end of establishing an RTP connection and the related RTCP connection for carrying a new media stream. In some embodiments of SCMRP 300A, process 400 can be implemented by RTCPSM 360A for each TMTM 330A after allocating that TMTM 330A and routing the appropriate $\Delta$TS value to that TMTM 330A. In some embodiments, process 400 can be initiated in block 402 periodically, every few minutes for example, for each running TMTM 330A, in order to compensate for clock drifts.

The following paragraphs describe an example process 400 that can be implemented by elements of an SCMRP 300A. A similar process with a few adaptations can be implemented by elements of an SCAVRP 300B. The adaptation can include performing similar blocks of process 400 by corresponding elements of SCAVRP 300B. For simplifying the description, only one embodiment of process 400 that is implemented by SCMRP 300A will be described in details with comments regarding adapting process 400 to be implemented by SCAVRP 300B.

Process 400 can be initiated 402 at the end of establishing an RTP connection and the related RTCP connection for carrying a new media stream. In some embodiments of SCMRP 300A, process 400 can be implemented by RTCPSM 360A for each TMTM 330A for preparing the appropriate $\Delta$TS value for that TMTM 330A. In a similar way, an embodiment of process 400 that is implemented by SCAVRP 300B can be executed by RTCPSM 360B per each VTMTM 330B and each ATMTM 370. In some embodiments, process 400 can be initiated in block 402 periodically, every few minutes for example, for each running TMTM 330A, in order to compensate for clock drifts.

After initiation in block 402 an RTCPSM 360A or 360B can send in block 404 a sender report (SR) over the RTCP connection that is related to that media stream (audio or video) toward the TMRE 130 that originated that stream and wait for receiving a receiver report (RR) from that TMRE 130. The received RR can be parsed and the value of the LSR field in the received RR can be checked in block 410. If the value of the LSR field is not zero, process 400 can proceed to block 412. If in block 410 the LSR value equals zero, then process 400 returns to block 404 and sends another SR. The LSR field in the RR is derived from the WC field in the last SR sent by the MRM 200 and received by that TMRE 130.

At block 412 the value of the round trip time (RTT) related to that stream can be calculated. An example of method 400 can calculate the RTT by using:

(a) The value of the MRM 200 relevant wall clock (A/V) when the RR was received at the MRM 200. This value for a video stream can be referred as <V RR local Receive time> and for an audio stream as <A RR local Receive time>;

(b) The value of the DLSR field in the received RR, that represents the delay at the TMRE 130 from the time of receiving the last SR from the MRM 200 to the time that the TMRE 130 sent that RR. This value for a video stream can be referred to as <V RR:DLSR> and for an audio stream can be referred to as <A RR:DLSR>; and (c) The value of the LSR field in the received RR is derived from the WC field in the last SR sent by the MRM 200 and received by that TMRE 130. This value for a video stream can be referred as <V RR:LSR> and for an audio stream can be referred as <A RR:LSR>.

An example formula for calculating the RTT value for a video stream (RTTv) can be:

$$\text{RTTv} = \langle V \text{ RR local Receive time} \rangle - \langle V \text{ RR:DLSR} \rangle - \langle V \text{ RR:LSR} \rangle$$

In a similar way, an example formula for calculating the RTT value for an Audio stream (RTTa) can be:

$$\text{RTTa} = \langle A \text{ RR local Receive time} \rangle - \langle A \text{ RR:DLSR} \rangle - \langle A \text{ RR:LSR} \rangle$$

After calculating in block 412 the RTT for the relevant stream, method 400 may wait in block 420 to receive an SR that was sent from the TMRE 130 over the relevant RTCP connection. The received SR can be parsed by RTCPSM 360A or 360B and the value of the TMRE 130 wall clock field in the received SR can be retrieved. Based on the calculated RTT and the retrieved wall clock value and the MRM 200 wall clock value, the wall clock difference (WC_DIFF) between the MRM 200 wall clock and the TMRE 130 wall clock that is related to that stream can be calculated in block 422. An example of method 400 can estimate the WC_DIFF of that stream by using:

(a) The value of the wall clock field in the received SR. The WC field represents the value of the wall clock at the TMRE 130 that sent the SR at the moment that the SR was sent. This value for a video stream can be referred as: <V SR:WC>; and for an audio stream can be referred as: <A SR:WC>;

(b) The value of the wall clock in the MRM 200 at the moment that the SR was received by the RTCPSM 360A or 360B. This value for a video stream can be referred to as: <V SR local receive time>; the value for an audio stream can be referred to as: <A SR local receive time>; and (c) The estimated value of the relevant RTT that was calculated at block 412.

An example formula for estimating the value WC_DIFF for a video stream (WC_DIFF$_v$) can be:

$$(\text{WC\_DIFF}_v) = \langle V \text{ SR:WC} \rangle + 0.5 \times \text{RTTv} - \langle V \text{ SR local receive time} \rangle$$

In a similar way, an example formula for estimating the WC_DIFF value for an audio stream (WC_DIFF$_a$) can be:

$$(\text{WC\_DIFF}_a) = \langle A \text{ SR:WC} \rangle + 0.5 \times \text{RTTa} - \langle A \text{ SR local receive time} \rangle$$

Using half of the RTT may not accurately represent the uplink travel time, since the RTT may not be divided symmetrically between the uplink and the downlink. Accordingly, half of RTT is just an estimation of the actual uplink travel time. However it does not affect the RMRE 130's ability to synchronize different streams coming from the same TMRE 130, since it will similarly affect the ΔTS of each of the streams, audio and video.

In some embodiments, the first WC_DIFF that was estimated, for audio or for video, can be defined as the WC_DIFF between the relevant TMRE 130 and the MRM 200. This WC_DIFF value can be used for calculating ΔTS for each one of the streams generated by this TMRE 130.

In other embodiments, the selected WC_DIFF can be the smallest WC_DIFF that was estimated for all streams from that TMRE 130.

Next, at block 424 a difference value (ΔTS) that can be used for transforming the TS of each received packet that carries relay media of that stream into the MRM 200 time domain can be calculated. Calculating the value of ΔTS can be based on the estimation of the WC_DIFF and parameters retrieved from the SR, which was received in block 420. An example of method 400 can estimate the ΔTS of that stream by using:

(a) The value of the wall clock field in the received SR, <V SR:WC> for a video stream and <A SR:WC> for an audio stream;

(b) The estimated value of the WC_DIFF related to that TMRE 130 that was calculated at block 422;

(c) The value of the wall clock in the RTCPSM 360A or 360B at a certain moment, when calculating the ΔTS for example. This value for a video stream can be referred to as: <V WC_REF>; and for an audio stream can be referred to as: <A WC_REF>.

(d) The value of the relevant TS counter in the RTCPSM 360A at the same certain moment, when calculating the ΔTS for example. This value for a video stream can be referred as: <V TS_REF>; and for an audio stream can be referred as <A TS_REF>.

(e) The value of the TS field in the received SR. The TS field represents the value of the TS at the TMRE 130 that sent the SR at the moment that the SR was sent. This value for a video stream can be referred to as: <V SR:TS>; and for an audio stream can be referred to as: <A SR:TS>; and (f) The timestamp clock rate (TS_CLOCK). This value can be related to the stream's payload type. An example value of TS_CLOCK for a video stream can be in the range of several tens of thousands, 90,000 for example. An example value of TS_CLOCK for an audio stream can be in the range of several thousands, 8,000 for example.

An example formula for calculating the value ΔTS for a video stream (ΔTSv) can be:

$$\Delta\text{TSv} = (\langle V \text{ SR:WC} \rangle - \text{WC\_DIFF} - \langle V \text{ WC\_REF} \rangle) \times \text{TS\_CLOCK}\_v + \langle V \text{ TS\_REF} \rangle - \langle V \text{ SR:TS} \rangle$$

In a similar way, an example formula for calculating the ΔTS value for an Audio stream (ΔTSa) can be:

$$\Delta\text{TSa} = (\langle A \text{ SR:WC} \rangle - \text{WC\_DIFF} - \langle A \text{ WC\_REF} \rangle) \times \text{TS\_CLOCK}\_a + \langle A \text{ TS\_REF} \rangle - \langle A \text{ SR:TS} \rangle$$

Other embodiments of RTCPSM 360A or 360B may use other formulas in order to transform the TS of received packets into the MRM 200 time domain. For example, some embodiments may use NTP synchronization protocol for both the MRE 130 and the MRM 120. Such embodiments may use the following formulas for calculating the ΔTS values for video and audio, respectively $$\Delta\text{TSv} = (\langle V \text{ SR:WC} \rangle - \langle V \text{ WC\_REF} \rangle) \times \text{TS\_CLOCK}\_v + \langle V \text{ TS\_REF} \rangle - \langle V \text{ SR:TS} \rangle$$

$$\Delta\text{TSa} = (\langle A \text{ SR:WC} \rangle - \langle A \text{ WC\_REF} \rangle) \times \text{TS\_CLOCK}\_a + \langle A \text{ TS\_REF} \rangle - \langle A \text{ SR:TS} \rangle$$

After calculating the WC_DIFF and the ΔTS values for a stream, a session table (ST) can be updated in block 426. If process 400 is executed for a new stream, the update can include allocating a new entry in the ST for the new stream and storing the estimated values of WC_DIFF and the ΔTS in that entry. If process 400 is executed for updating the values of an active stream, the update can include replacing the previous values of WC_DIFF and the ΔTS, which are written in the relevant entry, with the current estimated values of WC_DIFF and the ΔTS. In addition, the current estimated WC_DIFF and the ΔTS can be transferred by the RTCPSM 360A to the relevant TMTM 330A and method 400 can be terminated. Alternatively, the current estimated WC_DIFF and the ΔTS can be transferred to the corresponding VTMTM 330B or ATMTM 370 of RTCPSM 360B.

In one embodiment, an RTCPSM 360A or 360B can execute a plurality of processes 400 in parallel, one for each stream that is transmitted from the MREs 130 that participant in the session.

The above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method, comprising:
   receiving, at an intermediate device that is communicatively coupled between a plurality of media relay endpoints, a plurality of input streams from the plurality of media relay endpoints, wherein each stream comprises input data chunks;
   parsing the input data chunks;
   converting a timestamp field of each input data chunk into a manipulated timestamp, reflecting a single time domain; and
   calculating a parameter corresponding to each input stream for converting the timestamp field of the input data chunks into the single time domain, comprising:
      estimating a difference between a clock of a transmitting media relay endpoint of the input stream and a clock of the intermediate device; and
      determining the parameter as a function of the estimated difference, a timestamp clock rate associated with the input stream, a clock field and a timestamp field in a sender report corresponding to the input stream, a clock value of the intermediate device, and a timestamp value of the intermediate device,
      wherein the clock value of the intermediate device and the timestamp value of the intermediate device are obtained at a same time.

2. The method of claim 1, further comprising:
   creating output data chunks, each associated with a relevant manipulated timestamp;
   organizing the output data chunks from a subset of the plurality of media relay endpoints into one or more output streams; and
   relaying the one or more output streams toward a receiving media relay endpoint.

3. The method of claim 2, further comprising:
   interpreting the one or more output streams by the receiving media relay endpoint as being generated using a single time domain.

4. The method of claim 2, wherein organizing the output data chunks comprises:
   writing the manipulated timestamp in a timestamp field of the corresponding output data chunk of the one or more output streams.

5. The method of claim 4,
   wherein the one or more output streams comprise a video stream and an audio stream, and
   wherein the video stream and the audio stream are synchronizable using the manipulated timestamp.

6. The method of claim 1, wherein the plurality of input streams comprise a plurality of video streams, further comprising:
   organizing the plurality of input streams into one or more output video streams, configured for composition into a continuous presence video image.

7. The method of claim 1, wherein the plurality of input streams comprise a plurality of audio streams, further comprising:
   organizing the plurality of audio streams into one or more output audio streams, mixable into a mixed audio stream.

8. The method of claim 1, wherein the single time domain is a time domain of the intermediate device.

9. The method of claim 1, wherein the intermediate device is a media relay multipoint control unit.

10. The method of claim 1, wherein converting the timestamp field comprises modifying the timestamp field of the input data chunks by the parameter corresponding to the input stream.

11. The method of claim 1, further comprising:
    combining the output data chunks into a single output stream.

12. The method of claim 1, further comprising:
    sending a single sender report per media type from the intermediate device to each receiving media relay endpoint, representing the single time domain.

13. The method of claim 1, further comprising:
    organizing the output data chunks from a subset of the plurality of media relay endpoints into one or more output streams; and
    combining the one or more output streams into a continuous presence video image by a receiving media relay endpoint.

14. The method of claim 1, wherein the plurality of input streams comprise a plurality of input audio streams, further comprising:
    associating the value of the manipulated timestamp of an input audio data chunk with an identifier of the input stream that carries that input audio data chunk;
    decoding received input audio data streams into decoded audio streams;
    selecting and mixing two or more decoded audio streams into a mixed audio stream;
    compressing the mixed audio stream into an output mixed audio stream;
    organizing the output mixed audio stream into a stream of output mixed audio data chunks; and
    transferring the stream of output mixed audio data chunks toward a receiving media relay endpoint,
    wherein the acts of decoding, selecting, compressing and organizing preserve an association between the output mixed audio data chunks, the corresponding manipulated timestamps and the stream identifiers.

15. The method of claim 14, wherein the act of organizing comprises:
    manipulating each of the output mixed audio data chunks to include information related to the one or more stream identifiers and the one or more manipulated timestamps of input data chunks that are embedded in the mix.

16. The method of claim 14,
    wherein the act of associating comprises:
       aligning the input data chunks at the intermediate device according to their manipulated timestamps, prior to mixing them, and wherein the act of organizing comprises:
inserting the manipulated timestamps as the manipulated timestamp of the output mixed audio data chunks.

17. A media relay multipoint controller comprising:
a signaling and control module configured to select one or more transmitting media relay endpoints of a plurality of transmitting media relay endpoints; and
a compressed media processor controlled by the signaling and control module, configured to:
parse input data chunks corresponding to a plurality of input streams;
convert a timestamp field of the input data chunks from a received timestamp value to a manipulated timestamp value reflecting a single time domain; and
calculate a parameter for each input stream of the plurality of input streams for use in converting the timestamp fields of each input data chunk contained in the input stream, comprising configuring the compressed media processor to:
estimate a difference between a wall clock of each transmitting media relay endpoint and a wall clock of the media relay multipoint controller; and
determine the parameter as a function of the estimated difference, a timestamp clock rate used for the input stream, a value of a wall clock field and a timestamp field in a sender report corresponding to the input stream, and the wall clock value and a timestamp value of a relevant media clock of the media relay multipoint controller,
wherein the wall clock value and the timestamp value of relevant media clock of the media relay multipoint controller are obtained at a same time.

18. The media relay multipoint controller of claim 17, wherein the compressed media processor is further configured to:
organize the input data chunks from selected transmitting media relay endpoints into one or more output streams, where each data chunk of each output stream is associated with a corresponding manipulated timestamp; and
transfer the one or more output streams toward a receiving media relay endpoint.

19. The media relay multipoint controller of claim 18, wherein the one or more output streams comprise a video stream and an audio stream, and
wherein the timestamp field is used by the receiving media relay endpoint for synchronizing the video stream with the audio stream.

20. The media relay multipoint controller of claim 18, wherein the compressed media processor is configured to transfer the one or more output streams toward a receiving media relay endpoint via a single real time protocol connection between the media relay multipoint controller and the receiving media relay endpoint.

21. The media relay multipoint controller of claim 17, wherein the plurality of input streams comprises a plurality of video streams.

22. The media relay multipoint controller of claim 17, wherein the plurality of input streams comprises a plurality of audio streams.

23. The media relay multipoint controller of claim 17, wherein the single time domain is associated with the media relay multipoint controller.

24. The media relay multipoint controller of claim 17, wherein the compressed media processor is configured to convert the timestamp field by being configured to
adjust the timestamp field by the parameter for the corresponding input stream.

25. The media relay multipoint controller of claim 17, wherein the compressed media processor is further configured to send a single sender report per media type to each receiving media relay endpoint, representing the single time domain.

26. The media relay multipoint controller of claim 17,
wherein plurality of input streams comprise a plurality of input audio streams, and
wherein the compressed media processor is further configured to:
associate the manipulated timestamp value of input audio data chunks with an identifier of the stream that caries that input audio data chunk;
decode obtained input audio data streams into decoded audio streams;
select and mix a plurality of the decoded audio streams into a mixed audio stream;
compress the mixed audio stream into a stream of compressed mixed audio;
organize the stream of compressed mixed audio into a stream of output audio data chunks;
transfer the stream of output audio data chunks toward a receiving media relay endpoint; and
preserve an association between the output audio data chunks, the corresponding manipulated timestamp values, and the stream identifiers.

27. The media relay multipoint controller of claim 26, wherein the compressed media processor is further configured to:
add information related to the stream identifier and the manipulated timestamp to each related output audio data chunk.

* * * * *